(12) United States Patent
Trazkovich et al.

(10) Patent No.: US 11,934,190 B2
(45) Date of Patent: Mar. 19, 2024

(54) LOW-PROFILE ROBOTIC PLATFORM

(71) Applicant: SEA, LTD., Columbus, OH (US)

(72) Inventors: Alex Joseph Trazkovich, Galena, OH (US); An Thi Thuy Nguyen, Youngstown, OH (US); Jordan Matthew Koevenig, Hilliard, OH (US)

(73) Assignee: SEA, LTD., Columbus, OH (US)

( * ) Notice: Subject to any disclaimer, the term of this patent is extended or adjusted under 35 U.S.C. 154(b) by 861 days.

(21) Appl. No.: 16/994,059

(22) Filed: Aug. 14, 2020

(65) Prior Publication Data
US 2021/0048820 A1 Feb. 18, 2021

Related U.S. Application Data

(60) Provisional application No. 62/888,228, filed on Aug. 16, 2019.

(51) Int. Cl.
*G05D 1/00* (2006.01)
*G01M 17/007* (2006.01)
*G05D 1/02* (2020.01)
*G06N 20/00* (2019.01)

(52) U.S. Cl.
CPC ........ *G05D 1/0088* (2013.01); *G01M 17/007* (2013.01); *G05D 1/0246* (2013.01); *G05D 1/0255* (2013.01); *G05D 1/0257* (2013.01); *G05D 1/027* (2013.01); *G05D 1/0278* (2013.01); *G06N 20/00* (2019.01)

(58) Field of Classification Search
CPC ....... G06N 20/00; G01M 17/04; B60K 17/34; B62B 5/0033
See application file for complete search history.

(56) References Cited

U.S. PATENT DOCUMENTS

| 5,186,270 | A | * | 2/1993 | West | B60L 50/52 |
| | | | | | 198/779 |
| 5,379,842 | A | * | 1/1995 | Terry | B62D 7/02 |
| | | | | | 180/21 |
| 6,050,355 | A | * | 4/2000 | Beck, Jr. | B62D 55/062 |
| | | | | | 180/9.62 |
| 8,428,863 | B2 | | 4/2013 | Kelly et al. | |
| 8,428,864 | B2 | | 4/2013 | Kelly et al. | |
| 8,447,509 | B2 | | 5/2013 | Kelly et al. | |
| 8,457,877 | B2 | | 6/2013 | Kelly et al. | |
| 8,583,358 | B2 | | 11/2013 | Kelly et al. | |

(Continued)

FOREIGN PATENT DOCUMENTS

WO 2018007458 7/2016

*Primary Examiner* — Tony H Winner
(74) *Attorney, Agent, or Firm* — BakerHostetler

(57) ABSTRACT

Described herein are robotic platforms and associated features that may have applicability in a wide variety of applications and industries, but that may have particular applicability in automotive testing and testing of vehicles having autonomous or semi-autonomous driving features. Robotic platforms may include a low-profile chassis, one or more rotational elements coupled to one or more drive motors and supported within the chassis, and a control system coupled to and controlling the drive motor(s). Also disclosed are suspension systems that may maintain the chassis of a robotic platform above the ground in use but that allows the chassis to ground out when subject to a predetermined load, thereby spreading the load across the chassis.

28 Claims, 10 Drawing Sheets

(56) References Cited

U.S. PATENT DOCUMENTS

| | | |
|---|---|---|
| 8,589,062 B2 | 11/2013 | Kelly et al. |
| 8,751,143 B2 | 6/2014 | Kelly et al. |
| 8,755,999 B2 | 6/2014 | Kelly et al. |
| 8,762,044 B2 | 6/2014 | Kelly et al. |
| 9,182,942 B2 | 11/2015 | Kelly et al. |
| 9,827,998 B1 | 11/2017 | Kelly |
| 9,880,556 B2 | 1/2018 | Litz et al. |
| 11,066,283 B2* | 7/2021 | Chow .................. B66F 9/063 |
| 11,084,414 B2* | 8/2021 | Bettella .................. B60P 3/40 |
| 2001/0015298 A1* | 8/2001 | Bettella ............... B62B 5/0033 180/245 |
| 2014/0048343 A1* | 2/2014 | Fitch .................. B62D 55/20 180/9.1 |
| 2017/0036675 A1 | 2/2017 | Neads |
| 2017/0080846 A1* | 3/2017 | Lord .................. B60K 7/00 |
| 2018/0010984 A1 | 1/2018 | Silberling et al. |
| 2021/0219446 A1* | 7/2021 | Curlee ............... F16F 15/085 |
| 2021/0316604 A1* | 10/2021 | Tao .................. B60K 17/046 |

* cited by examiner

LOW-PROFILE ROBOTIC PLATFORM

CROSS-REFERENCE TO RELATED APPLICATIONS

This application claims priority to U.S. Provisional Application No. 62/888,228, which was filed on Aug. 16, 2019, the entirety of which is hereby incorporated by reference.

BACKGROUND

Historically, automotive testing has focused primarily on a vehicle's performance characteristics and driver and passenger safety. Recently, advances in automotive technology have introduced new features that are, or are likely to be, subject to more stringent testing and regulation. Some new features may include advanced driver systems, advanced driver-assistance systems, assisted driving systems, autonomous driving systems, partially autonomous driving systems, and the like. One or more such systems may enhance the operation of an automobile (such as alerting a driver to hazards) or may autonomously drive a vehicle in place of a human operator.

Traditional vehicle testing platforms, methods, and systems may not be well equipped to observe, measure, score, or compare some or all of these more advanced automotive features. Accordingly, there is a need for a testing platform capable of measuring one or more advanced automotive features. Such testing platforms may also prove useful in additional implementations and industries.

BRIEF SUMMARY

The current disclosure provides an automated robotic platform that is a low-profile, over-runnable platform that may be designed to carry testing apparatus in automotive testing. Such automotive testing may include the evaluation of advanced driver systems, advanced driver-assistance systems, assisted driving systems, autonomous driving systems, partially autonomous driving systems, driverless vehicles, and the like. Such testing apparatus may include soft targets, human forms, objects commonly encountered while driving, and the like.

A first aspect of the current disclosure is directed to a robotic platform for carrying one or more testing apparatus in automotive testing. The first aspect may include: a low-profile chassis including a substantially planar top surface and a plurality of side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; and a control system coupled to the one or more drive motors and to the one or more steering controls; wherein the substantially planar top surface may include a cut-out portion for each of the one or more drive wheels (or rotational elements) and for each of the one or more pivoting wheels (or rotational elements). In a more detailed embodiment, the cut-out portions for the pivoting wheels (or rotational elements) may be arcuate shaped, irregular polygon shaped or apeirogon shaped to substantially correspond to an arcuate range of pivoting allowed for the pivoting wheels (or rotational elements). In a further detailed embodiment, the cut-out portions for the drive wheels (or rotational elements) may be rectangular shaped. The one or more testing apparatus may include one or more soft targets.

A second aspect of the current disclosure is directed to a robotic platform for carrying one or more testing apparatus in automotive testing. The second aspect may include: a low-profile chassis including a substantially planar top surface and a plurality of side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; and a control system coupled to the one or more drive motor and to the one or more steering controls; wherein each of the one or more drive wheels (or rotational elements) and the one or more pivoting wheels (or rotational elements) may be supported within the chassis interior on a suspension system configured to allow the chassis to contact the road surface when a high load (more than 50 pounds in some embodiments, but typically 200 pounds or more) is applied to the top surface, thereby allowing a test vehicle to run over the chassis while transferring the load directly through the chassis to the road. The one or more testing apparatus may include one or more soft targets.

A third aspect of the current disclosure is directed to a robotic platform for carrying one or more testing apparatus in automotive testing. The third aspect may include: a low-profile chassis including a substantially planar top surface and a plurality of vertical side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; and a control system coupled to the one or more drive motor and to the one or more steering controls; wherein the one or more drive wheels (or rotational elements) and/or the one or more pivoting wheels (or rotational elements) may be positioned with respect to the one or more of the vertical side surfaces so that the distance from the outside edge of the chassis to the center of the wheels (or rotational elements) is less than the height of the chassis. The one or more testing apparatus may include one or more soft targets.

A fourth aspect of the current disclosure is directed to a robotic platform for carrying one or more testing apparatus in automotive testing. The fourth aspect may include: a low-profile chassis including a substantially planar top surface and a plurality of side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; a control system coupled to the one or more drive motor and to the one or more steering controls; and a vision system carried by the chassis providing visual information to the control system; wherein the control system may operate the one or more drive motor and the one or more steering controls selectively based upon remote control signals received by the control system and based upon the visual information. In an embodiment, a vision system may include one or more of a camera, lidar unit, radar unit, and/or a sonar unit. In a further detailed embodiment, the vision system may include an artificial-intelligence engine trained to visually recognize a lane marker, a reflective marker, a perimeter marker, a traffic signal, a traffic barrier, a traffic sign, and/or a traffic cone. In yet a further detailed embodiment, the platform further may include a safety brake system configured to automatically stop the platform upon determination by the computer control that the platform has traveled outside of a predefined perimeter and/or has contacted an object. Alternatively, or in addition, the vision system may process one or more vision signals with one or more components located within the robotic platform, attached to the robotic platform, or performed remotely and received wirelessly by the robotic platform. The one or more testing apparatus may include one or more soft targets.

A fifth aspect of the current disclosure is directed to a robotic platform for carrying one or more testing apparatus in automotive testing. The fifth aspect may include: a low-profile chassis including a substantially planar top surface and a plurality of side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; and a control system coupled to the one or more drive motor and to the one or more steering controls; wherein the one or more drive wheels (or rotational elements) and the one or more pivoting wheels (or rotational elements) may be supported within the chassis on wheel shafts and secured to the wheel shafts with removable shaft collars such that the wheels (or rotational elements) may be easily swapped out of the chassis with replacement wheels (or rotational elements). In a more detailed embodiment, the wheels (or rotational elements) and the replacement wheels (or rotational elements) may have different diameters ranging from approximately 2 to 6 inches. Alternatively, or in addition, the wheel shafts may also be removable and replaceable with new or different wheel shafts. Alternatively, or in addition, the replaceable wheel shafts may include a mechanical fuse that is configured to break when struck or loaded by the weight of a vehicle. The one or more testing apparatus may include one or more soft targets.

A sixth aspect of the current disclosure is directed to a robotic platform for carrying one or more testing apparatus in automotive testing. The sixth aspect may include: a low-profile chassis including a substantially planar top surface and a plurality of side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; a control system coupled to the one or more drive motor and to the one or more steering controls; and a suspension system supporting the one or more drive wheels (or rotational elements) and/or the one or more pivoting wheels (or rotational elements) within the chassis interior, the suspension system including one or more suspension springs carried on one or more suspension shafts, the suspension shafts being removable from the chassis to facilitate swapping out the suspension springs. In a more detailed embodiment, each suspension shaft may include a threaded end and an opposing screwdriver slot end, where each threaded end is threaded into a correspondingly threaded bore of the chassis and each opposing screwdriver slot end being exposed for manual access so that the suspensions shafts are easily removed and replaced using a screw driver to allow swapping out of the suspension springs. In a further detailed embodiment, the suspension system may further include a bearing housing seating for rotation of a wheel shaft for the one or more drive wheels (or rotational elements) or the one or more pivoting wheels (or rotational elements), wherein the bearing housing may be slidably positioned on the one or more suspension shafts between (a) the one or more suspension springs and (b) either the threaded end or the screwdriver slot end of the suspension shaft. The one or more testing apparatus may include one or more soft targets.

A seventh aspect of the current disclosure is directed to a robotic platform for carrying one or more testing apparatus in automotive testing. The seventh aspect may include: a low-profile chassis including a substantially planar top surface and a plurality of side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; a control system coupled to the one or more drive motor and to the one or more steering controls; and a sacrificial wear plate removably attached to an underside of the chassis, the sacrificial wear plate comprising a wear-resistant plastic. The one or more testing apparatus may include one or more soft targets.

An eighth aspect of the current disclosure is directed to a robotic platform for carrying one or more testing apparatus in automotive testing. The eighth aspect may include: a low-profile chassis including a substantially planar top surface and a plurality of side surfaces at least partially enclosing an interior; one or more drive wheels (or rotational elements) supported within the chassis interior and coupled to one or more drive motors; one or more pivoting wheels (or rotational elements) supported within the chassis interior and coupled to one or more steering controls; and a control system coupled to the one or more drive motor and to the one or more steering controls; wherein the one or more drive wheels (or rotational elements) and the one or more pivoting wheels (or rotational elements) may be supported within the chassis on wheel shafts, the wheel shafts further comprising a mechanical fuse configured to break when the chassis is struck by a vehicle or loaded by the weight of a vehicle. In a detailed embodiment, the mechanical fuse may be provided by a thinned section of the wheel shaft. Alternatively, the mechanical fuse may be provided by a coupling positioned between two axial sections of the wheel shaft, the coupling having a lower breaking strength than either of the two axial sections. The one or more testing apparatus may include one or more soft targets.

A ninth aspect of the current disclosure is directed towards a robotic platform for carrying one or more testing apparatus in automotive testing. The ninth aspect may include: a low-profile chassis including a substantially planar top surface and a plurality of side surfaces at least partially enclosing an interior; a pair of front wheels (or rotational elements) supported within the chassis interior; a pair of rear wheels (or rotational elements) supported within the chassis interior; and a skid-steer drive system coupled to the front wheels and rear wheels. The one or more testing apparatus may include one or more soft targets.

A tenth aspect is directed towards a robotic platform for carrying one or more testing apparatus in automotive testing. The one or more testing apparatus may include one or more soft targets and may specifically carry one or more pedestrian soft targets. The tenth aspect may include one, more than one, or all of the following features. The tenth aspect may include a low-profile chassis having a substantially planar top surface and a periphery comprising one or more surfaces disposed approximately perpendicularly to the top surface, the chassis at least partially enclosing an interior. In an embodiment, the chassis may be constructed from substantially a single piece of metal or other material. In an embodiment, the chassis may be milled from a single piece of aluminum. In an alternate embodiment, the chassis may be cast as a single piece. The tenth aspect may further include four drive wheels (or other rotational elements) supported within the chassis interior and coupled to one or more drive motors. Torque from the one or more drive motors may be employed to brake the robotic platform. The robotic platform may be four wheel drive, and each of the wheels may be in a fixed position, with the platform being steered with a skid-steering system. The motor shafts may be coupled to the wheel shafts by a flexible coupler with the motor(s) grounded to the chassis. Each wheel shaft may be supported by a bearing block, and the bearing block may be supported by one or more cantilevered springs grounded to the chassis on one end and to the bearing block on the other. In an embodiment, each bearing block may float with respect to the chassis (e.g., may be detached from the chassis), with a degree of float determined primarily by the stiffness and length of the cantilevered springs and a load on the platform.

Several specific features that may be present on some or all of the foregoing aspects are discussed below, and it should be understood that various of the following features may be presented as alternatives that may be substituted or featured on a particular robotic platform.

In some embodiments, the chassis may be substantially rectangular or square. Alternatively, or in addition, the chassis may be less than 5" high. Alternatively, or in addition, the chassis may have the following approximate dimensions 30"×30"×3.6". Alternatively, or in addition, the chassis may include rounded corners between the planar top surface and the side surfaces. Alternatively, or in addition, the platform may include a radar-absorbing material covering outer surfaces of the chassis. Alternatively, or in addition, the planar top surface may further include mounting points for mounting soft targets thereon.

In other embodiments, the chassis may have approximate dimensions of 24"×24"×1.88" and may have a weight of approximately 40 pounds (plus or minus about 5%). The chassis may be constructed from substantially a single piece of metal or other material. In an embodiment, the chassis may be milled from a single piece of aluminum. In an alternate embodiment, the chassis may be cast as a single piece. The chassis may include a cut-out to access one or more components, such as a removable battery.

In some embodiments, the platform may include two rear drive wheels (or rotational elements) driven by electric motors and may include two front pivoting wheels (or rotational elements) coupled to a steering control system. Alternatively, or in addition, the platform may include brakes coupled to the drive wheels (or rotational elements).

In other embodiments, the platform may include a plurality of drive wheels (or rotational elements). In embodiments where the platform has four wheels, the platform may include a four wheel drive system and may include a skid-steer system rather than pivoting wheels. In an embodiment, two wheels may be driven by a first motor, and two wheels may be driven by a second motor. In a further embodiment, a first motor may drive the left-side wheels, and a second motor may drive the right-side wheels. A first motor and a second motor may be independently controlled such that, when a different amount of torque is applied to the wheel shafts by each motor, turning and steering can be achieved. In an embodiment, each wheel may be separately controlled by a separate motor.

In some embodiments, the platform may further include GPS and one or more inertial measurement units or inertial measurement systems provided with the chassis and providing positional signals, heading signals, and/or speed signals to the control system. Alternatively, or in addition, the platform may further include a safety brake system configured to automatically stop the platform upon determination by the control system that the platform has experienced a system failure, has traveled outside of a predefined perimeter, has satisfied a timing event, has contacted a moving or stationary object, and/or has contacted the ground.

In some embodiments, the platform may further include an extension assembly coupled to and positioned laterally from the chassis for mounting a testing apparatus (e.g., a soft target) thereon. In a further detailed embodiment, the extension assembly may include a plate adapted to be coupled to the chassis and to be suspended off the ground with the top surface of the plate no more than 25 mm from the ground when coupled to the chassis, the planar extension plate including mounting points for mounting one or more testing apparatus thereon. A testing apparatus may include a soft target, such as a vulnerable-road-user target. A testing apparatus may be sized and shaped to mimic a human form, such as a mannequin or dummy. Alternatively, or in addition, the extension assembly may be suspended off the ground when mounted to the chassis or may rest on the ground when mounted to the chassis. Alternatively, or in addition, the extension assembly may be pushed by the robotic platform, pulled by the robotic platform, or attached alongside the platform.

In some embodiments, the platform may further include a safety brake system configured to automatically stop the platform upon determination by the computer control that the platform has traveled outside of a predefined perimeter and/or has contacted an object and/or has contacted the ground and/or has experienced a failure event. In a more detailed embodiment, the safety brake system may include a kill switch configured to kill power to at least part of the robotic platform. Alternatively, or in addition, the safety brake system may include fail-safe brakes, normally open or normally closed, held in a disengaged position that engage upon a received "brake" signal. Alternatively, or in addition, the "brake" signal may be received upon power-loss, network failure, and/or by the control system. Alternatively, or in addition, the safety brake system may include fail-safe brakes held in a disengaged position that engage upon the safety brake system losing (or a portion thereof) power.

In some embodiments, braking may derive, in whole or in part, from motor torque.

In some embodiments, the motor shafts may be coupled to the wheel shafts by a flexible coupler with the motor(s) grounded to the chassis. Each wheel shaft may be supported by a bearing block, and the bearing block may be supported by one or more cantilevered springs grounded to the chassis on one end and to the bearing block on the other. In an embodiment, each bearing block may float with respect to the chassis (e.g., may be detached from the chassis), with a degree of float determined primarily by the stiffness and length of the cantilevered springs and a load on the platform. The cantilevered springs may be configured to slightly flex when road irregularities, bumps, holes, terrain disturbances, and the like are encountered, providing suspension. When a robotic platform is loaded by a heavy load (such as when overrun by a test vehicle), the cantilevered springs may flex more severely, allowing the platform to ground out such that the chassis contacts the ground, distributing the heavy load across the chassis.

BRIEF DESCRIPTION OF THE DRAWINGS

The foregoing and other features of the present disclosure will become more fully apparent from the following description and appended potential points of novelty, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings. In the drawings.

DETAILED DESCRIPTION

Figure 1:
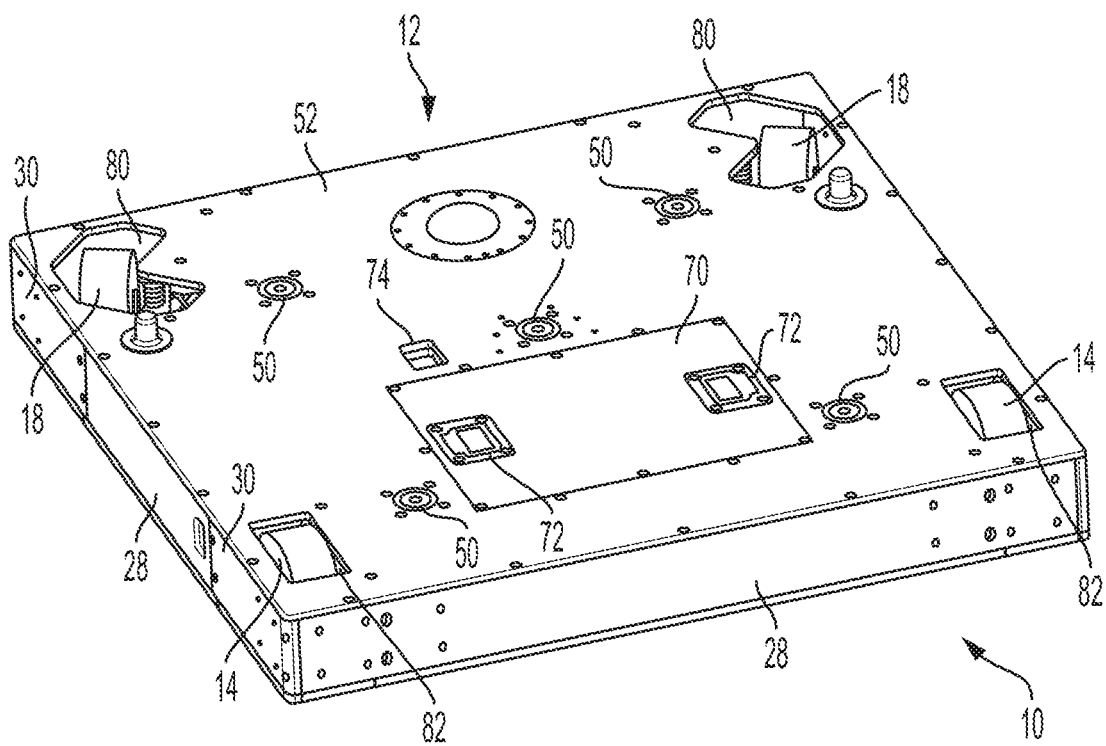
FIG. 1 depicts a top view of an example embodiment of a robotic platform according to one or more aspects of the present disclosure.

In the following detailed description, reference is made to the accompanying drawings, which form a part hereof. In the drawings, similar symbols typically identify similar components unless context dictates otherwise. The illustrative embodiments described in the detailed description, drawings, and potential points of novelty are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is generally drawn to low-profile robotic platforms. Specifically, this disclosure describes low-profile robotic platforms with configurations, including suspension systems, allowing the chassis of the platform to contact the ground when loaded to distribute the load across a greater area. Even more specifically, this disclosure describes overrunnable, low-profile robotic platforms configured for automotive testing. However, while certain specific embodiments may be described with particular advantages for automotive testing, this disclosure is not necessarily so limited.

Figure 2:
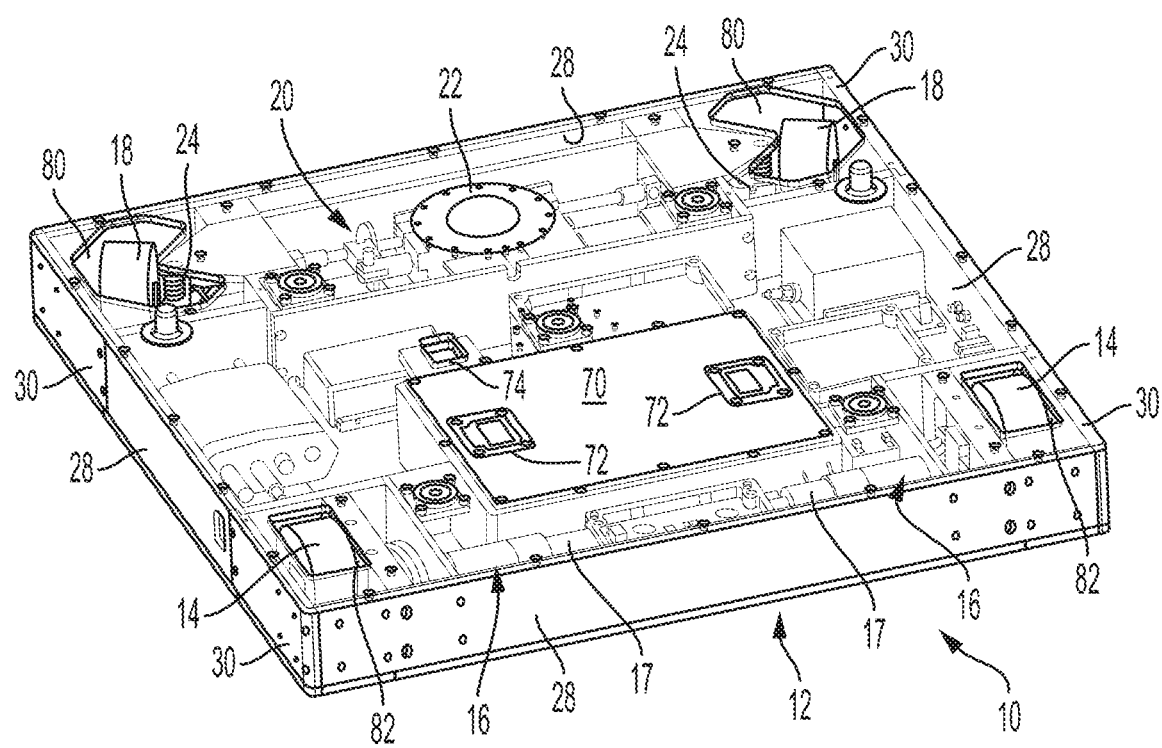
FIG. 2 depicts a top view of an example embodiment of a robotic platform with at least a portion of an upper planar surface made transparent to illustrate interior components according to one or more aspects of the present disclosure.

Referring to FIGS. 1 and 2, an example embodiment of an automated robotic platform according to an aspect of the current disclosure is a low-profile, over-runnable platform 10. Low-profile, over-runnable platform 10 may be configured to carry one or more automotive testing apparatus, including one or more soft targets designed and configured for automotive testing, including the evaluation of advanced driver systems, advanced driver-assistance systems, assisted driving systems, autonomous driving systems, partially autonomous driving systems, and the like. FIG. 2 shows the same embodiment as FIG. 1 except that the top panel 52 is made transparent (and, accordingly, is not labeled in FIG. 2) to allow a view of the interior of the chassis 12.

An example low-profile, over-runnable robotic platform may include a 30"×30"×3.6" chassis 12 supported by one or more rotational elements 14/18. The chassis 12 may be constructed from reinforced aluminum. Rotational elements 14/18 may include two rear wheels 14 and two front wheels 18. The two rear wheels 14 may be coupled to drive motors 16, and the two front wheels 18 may be coupled to a steering linkage 20 driven by a linear actuator 22. It may be appreciated that other rotational elements may be used in place of wheels 14/18, such as (but not limited to) tracks or belts that rotate about gears or pulleys. It may be further appreciated that the steering of the platform 10 may be performed by way of a skid-steer mechanism and/or control (which may be accomplished by turning left and right wheel pairs at different speeds).

Another example low-profile, over-runnable robotic platform may include a 24"×24"×1.88" chassis 12 supported by one or more rotational elements 14/18. The chassis 12 may be constructed from aluminum and may be milled substantially from a lone piece of aluminum. Alternatively, a chassis 12 may be cast as substantially a single metallic piece. Alternatively, a chassis 12 may be additively manufactured as a single metallic piece. Rotational elements 14/18 may include four wheels configured in a four-wheel-drive drivetrain. A plurality of drive motors 16 may be coupled to the wheels. In an embodiment, one drive motor may power half of the wheels (e.g., the wheels on one side of the platform), while a second drive motor may power the wheels on a second half of the platform. Such a configuration (e.g., one motor powering wheels on a left side and a second motor powering wheels on a right side) may enable a robotic platform to have skid steering. Alternatively, each wheel may be independently powered by a dedicated motor. By having skid steering, the need for pivotable wheels and mechanical steering components (and associated costs and weight disadvantages) may be reduced or eliminated.

Figure 3:
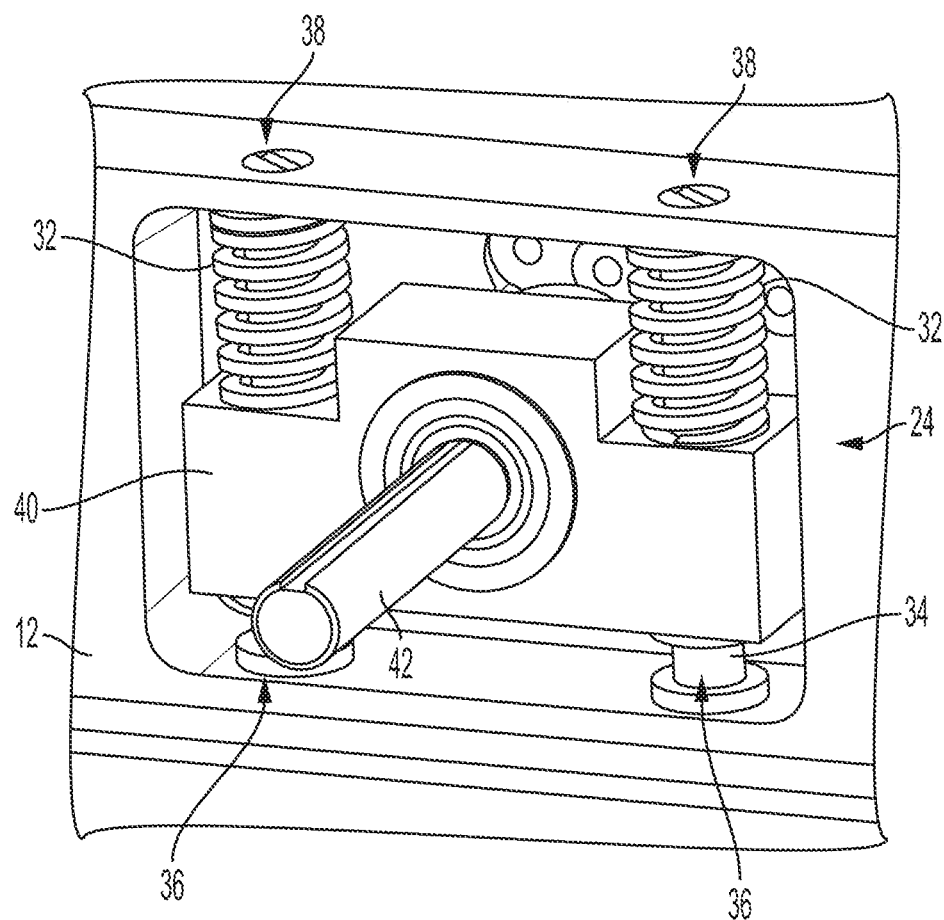
FIG. 3 depicts an example embodiment of a suspension system for a robotic platform according to one or more aspects of the present disclosure.

Referring to FIG. 3, one embodiment of a suspension 24 may reduce vibration while maintaining clearance between the chassis and the ground when the platform is loaded with up to 30 kg of payload. Meanwhile, when loaded with higher weights, for example of 100 kg and above, such as when an automobile overruns the platform, the wheels may retract into the platform and the chassis may contact the ground, allowing the heavier load to transfer through the reinforced chassis to the ground, which may prevent or reduce the likelihood of failure of the chassis or components inside the chassis. The load required to ground out the chassis may vary with the springs selected for the suspension. A typical use case may be around 200 pounds when the platform is configured for automotive testing. Alternatively, it can be made as low as 50 pounds or as high as 500 pounds, for example. The lower bound may be defined by any weight higher than a load the platform is configured to carry, such as a soft target and any connections supporting the soft target and coupling the soft target to the platform. The higher bound may be defined by any weight lower than a failure point (e.g., breaking or severely bending) the chassis; the higher bound may accordingly vary with the material from which the chassis is constructed. To facilitate this ground-out capability, the upper planar surface 52 of the chassis 12 may include cut-out portions 80/82 to allow the wheels 14/18 to be received up into them when the chassis is grounded. Cut-out portions 80 may be arcuate shaped, irregular polygon shaped or apeirogon shaped to substantially correspond to an arcuate range of pivoting allowed for the front pivoting/steering wheels 18. Cut-out portions 82 may be rectangular shaped to correspond to the non-pivoting shape and nature of the rear drive wheels 14.

Figure 11:
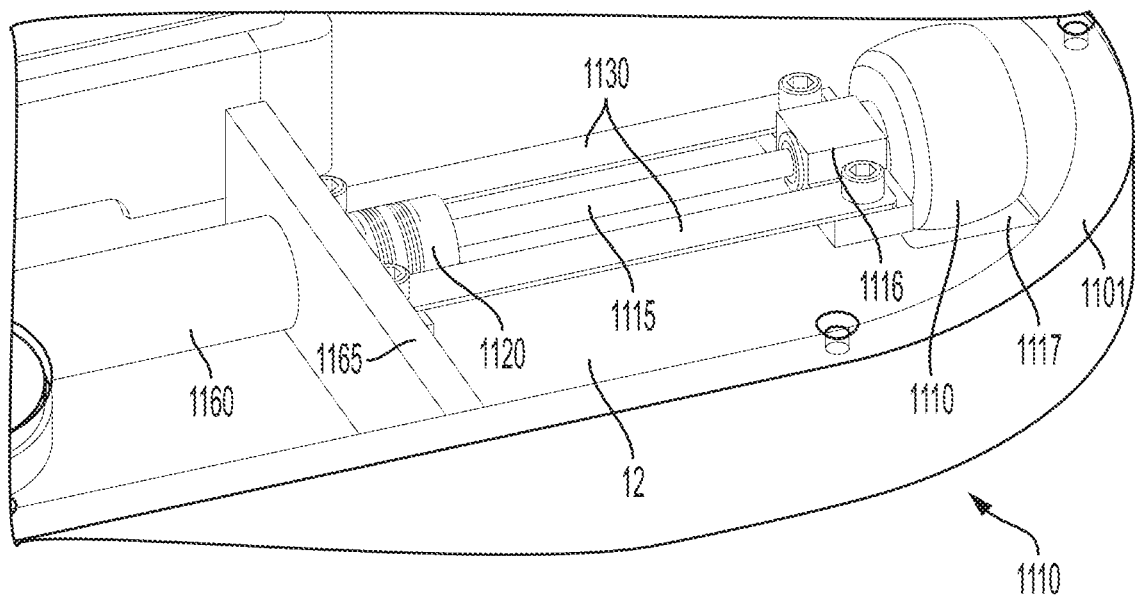
FIG. 11 illustrates a partial isometric view of an example embodiment of a robotic platform with an upper planar surface made transparent to illustrate interior example suspension components according to one or more aspects of the present disclosure.
Figure 12:
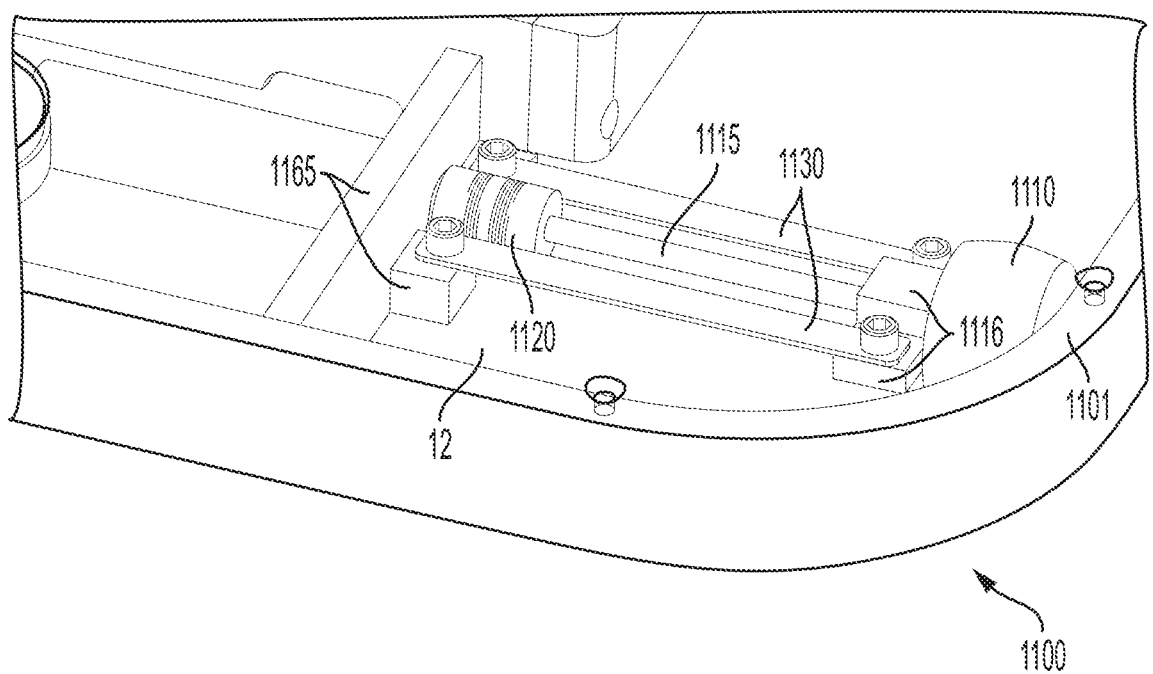
FIG. 12 illustrates a partial isometric view of an example embodiment of a robotic platform with an upper planar surface made transparent to illustrate interior example suspension components according to one or more aspects of the present disclosure.
Figure 13:
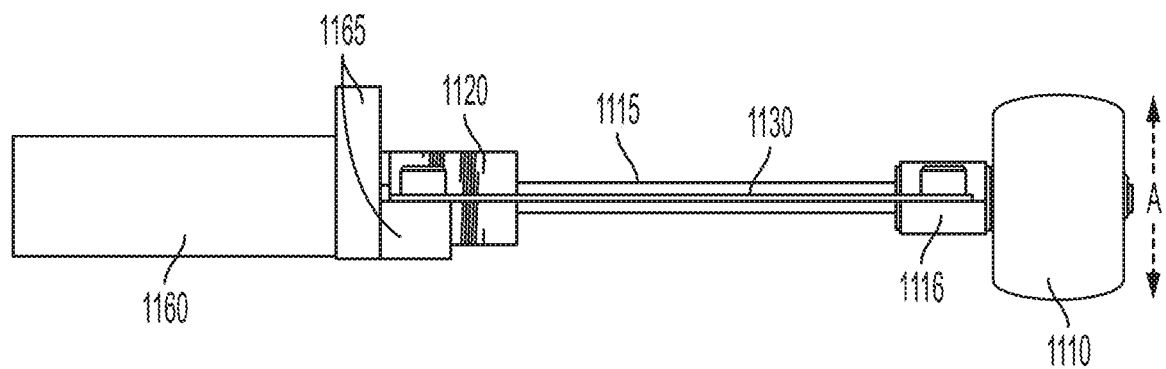
FIG. 13 depicts a side view of an example motor, flexible coupler, wheel shaft, wheel, and suspension components according to one or more aspects of the present disclosure.

An alternate suspension system may be employed in other embodiments. Referring to FIGS. 11-13, views of certain components forming all or part of an alternate suspension system may be seen. FIG. 11 illustrates a partial isometric view of an example embodiment of a robotic platform 1100 with an upper planar surface made transparent (and thus not labeled) to illustrate interior example suspension components according to one or more aspects of the present disclosure. Robotic platform 1100 may include a plurality of motors 1160. In an embodiment, robotic platform 1100 may contain two motors 1160, each motor 1160 independently supplying torque to a pair of wheels 1110 (e.g., a pair of wheels 1110 on the same side of the robotic platform 1100). A motor shaft of motor 1160 may be coupled to a wheel shaft 1115 by a flexible coupler 1120. A motor 1160 may be supported by a support component 1165, and support component 1165 may be coupled to (or form part of) the chassis 12. Disposed along either lateral side of the flexible coupler 1120 and wheel shaft 1115 may be one or more cantilever springs 1130. Cantilever springs 1130 may be coupled to chassis 12 or support component 1165 and may extend coaxially and along either lateral side of wheel shaft 1115. Wheel shaft 1115 may extend toward a periphery 1101 of the robotic platform 1100 and may be coupled to and/or extend through a bearing block 1116, terminating at the wheel 1110. A second end of each cantilever spring 1130 may be coupled to bearing block 1116. Wheel 1110, or a portion thereof, may extend out of chassis 12 through a cut-out 1117 to make contact with the ground. In an embodiment, bearing block 1116 is not coupled to chassis 12 and may be able to (along with wheel 1110) float vertically in response to loads placed on the robotic platform 1100, aberrations in a ground surface, and the like, thus providing suspension. The degree of vertical float may be determined by a number of factors, including the stiffness of cantilever springs 1130, the length of cantilever springs 1130, a load placed on a robotic platform 1100, and the like. For example, when encountering a road aberration (e.g., a bump, slope, small pit, etc.), cantilever springs 1130 may flex slightly, providing suspension. If robotic platform 1100 encounters a heavy load, such as when a vehicle runs over robotic platform 1100, the cantilever springs 1130 may flex more significantly, allowing the wheel 1110 to collapse back through cut-out 1117 and toward the interior of the chassis 12, allowing chassis 12 to ground out and distribute the heavy load across the chassis 12.

FIG. 12 illustrates a partial isometric view of an example embodiment of a robotic platform 1100 with an upper planar surface made transparent (and thus not labeled) to illustrate interior example suspension components according to one or more aspects of the present disclosure. FIG. 12 provides an alternate view of the robotic platform 1100 depicted in FIG. 11. In FIG. 12, the motor is also removed from view. A wheel 1110 may be coupled to a wheel shaft 1115, which may extend from a wheel 1110 interiorly through a bearing block 1116, terminating in a flexible coupler 1120 which couples wheel shaft 1115 to a motor shaft. On each lateral side of the wheel shaft 1115 and flexible coupler 1120 may be disposed one or more cantilever springs 1130, which may extend coaxially along wheel shaft 1115. The end of each cantilever spring 1130 farthest from wheel 1110 may be coupled to a support component 1165, which may be attached to or form part of chassis 12. The other end of each cantilever spring may be coupled to the bearing block 1116.

FIG. 13 shows a side view of an example motor 1160, flexible coupler 1120, wheel shaft 1115, wheel 1110, and cantilever springs 1130 according to one or more aspects of the present disclosure. Motor 1160 may provide torque to a wheel 1110. Motor 1160 may include a motor shaft disposed through a support component 1165, which may be coupled to a robotic platform chassis or form part of the chassis itself. The motor shaft may extend toward a wheel 1110 and may be coupled to a wheel shaft 1115 by a flexible coupler 1120. Wheel shaft 1115 may extend from flexible coupler 1120 toward wheel 1110 and may extend through and engage a bearing in a bearing block 1116. Cantilever springs 1130 may be disposed on either lateral side of wheel shaft 1115 and flexible coupler 1120 and may extend coaxially along either lateral side of the wheel shaft 1115. Cantilever springs 1130 may be coupled at one end at the support component 1165 and at the other end at the bearing block 1116. Such a configuration of components provides a suspension, allowing bearing block 1116 and wheel 1110 to float vertically in a direction A as cantilever springs 1130 flex.

Although the exemplary platform is shown unpainted in FIG. 1 to show an example construction, the chassis 12 may be finished with a durable grey colored coating and/or a radar-absorbing and/or a light-absorbing coating.

Figure 8:
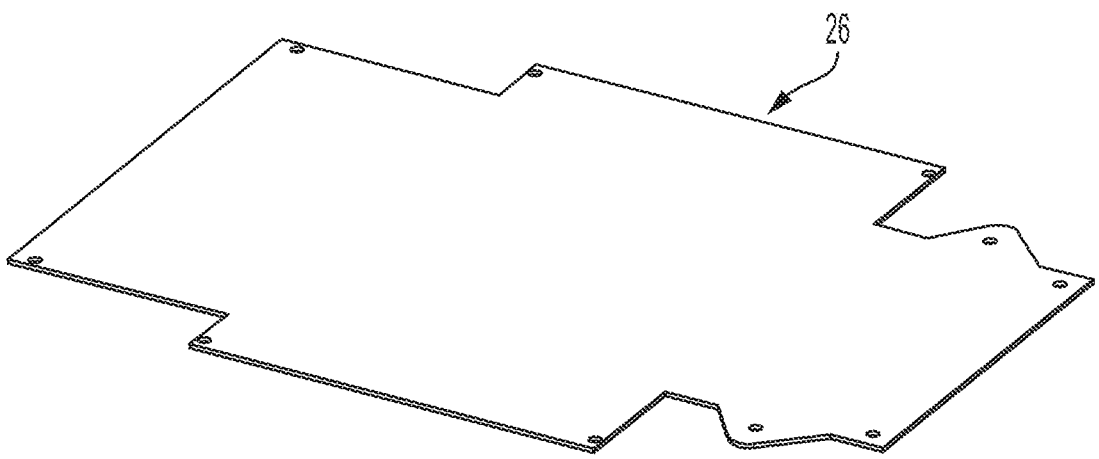
FIG. 8 depicts an example embodiment of a sacrificial wear plate according to one or more aspects of the present disclosure.

Referring to FIG. 8, the bottom of the platform 10 may have a sacrificial wear plate 26 removably mounted thereto. Sacrificial wear plate 26 may be constructed from one or more wear-resistant plastics and may attach to the underside of the platform baseplate. Sacrificial wear plate 26 may be swapped after it becomes worn by a large number of overrun incidents and may generally help prevent damage to the more expensive metal chassis or interior components. In an embodiment, an example wear plate 26 may be made from UHMW (ultra-high molecular weight) polyethylene, which has superior toughness and wear resistance combined with low cost, making it ideal for a sacrificial wear plate. Other wear resistant plastics may include nylon, PTFE, PET, acetal, and PEEK. In an example embodiment, the wear plate 10 may be ⅛" thick, may have a similar profile to the underside of the platform, and may include countersinks for small flat head cap screws to attach it to the robot. The countersinks may be deeper than standard, allowing the screw head to sit recessed below the surface and avoid direct wear.

Referring back to FIGS. 1 and 2, although the corners of an example platform may be rounded to reduce impact on a test vehicle that may come into contact with the low-profile robotic platform, the sides 28 of the chassis 12 may be substantially vertical. This may allow the wheels 14/18 to be located very close to the edges of the chassis 12, which in turn may allow the platform 10 to navigate uneven terrain without the sides of the chassis becoming stuck, permitting operation on rougher asphalt test pads, test pads with varying slopes, dirt pads, and sidewalks. In an embodiment, the distance from the outside edge of the platform to the center of the wheels may be less the than the height of the chassis. Note that the example platform overrun height may be very close to the width of a standard 4"×4" (nominal) wooden board.

The exemplary platform may feature wheels 14/18 which may be swapped in approximately one minute each by simply removing a small cover plate 30 and a shaft collar (not shown), swapping the wheel 14/18, and replacing the shaft collar and plate 30. The example platform may operate with wheels as small as 3.6 inches or as large as 4.6 inches in diameter (but it is within the scope of the disclosure that wheels can range from 2-6 inches in diameter in some embodiments), and sets of varying-diameter wheels may be provided as part of a package. The 3.6 inch wheels, for example, may retract fully into the chassis 12 upon the platform being overrun, while the 4.6 inch wheels may increase ground clearance and top speed but may protrude 1 inch above the top surface of the platform (through the cut out portions 80/82) when it is overrun. Wheel sizes may be modified if chassis dimensions are modified. For example, on a smaller chassis (e.g., 24"×24"×1.88"), one or more wheels may have a diameter of about 1.75". The shaft collars can be any standard shaft collar as known in the art and may require an Allen wrench to remove/replace the shaft collars. Alternatively, the shaft collars may be tool-less.

Referring to FIG. 3, in an embodiment, a platform's suspension 24 may include suspension springs 32 carried on suspension shafts 34. In an example embodiment, the suspension shafts 34 may be removable from the chassis 12 to facilitate swapping out the suspension springs 32. In an example embodiment, each suspension shaft 34 may include a threaded end 36 and an opposing screwdriver slot end 38, where each threaded end may be threaded into a correspondingly threaded bore of the chassis 12, and each opposing screwdriver slot end 36 may be exposed for manual access so that the suspension shafts 34 may be easily removed and replaced using a screw driver to allow swapping out of the suspension springs 32. While a standard flathead screwdriver slot is shown in FIG. 3, it is within the scope of the disclosure to provide any known alternative, such as a Phillips slot, a hexagonal slot, star-shaped slot and the like. The example suspension system 24 shown in FIG. 3 may further include a bearing housing 40 seating a wheel shaft 42 for the drive wheels 14 or the pivoting wheels 12, where the bearing housing 40 may be slidably positioned on the suspension shafts 34 between the suspension springs 32 and either the threaded end 36 or the screwdriver slot end 38 of the suspension shaft 34. With such a structure, the platform's suspension springs 32 may be changed using a simple process requiring only a screwdriver. One set each of soft, medium, and stiff suspension springs 32, for example, may be included in the package for selective swapping out. Stiffer suspension springs may increase ground clearance for a given load and wheel diameter, while softer suspension springs may further reduce vibration and allow navigation on rougher terrain. Of course, FIG. 3 illustrates just one possible suspension system. FIGS. 11-13, as discussed, provide an alternative suspension system.

Figure 6:
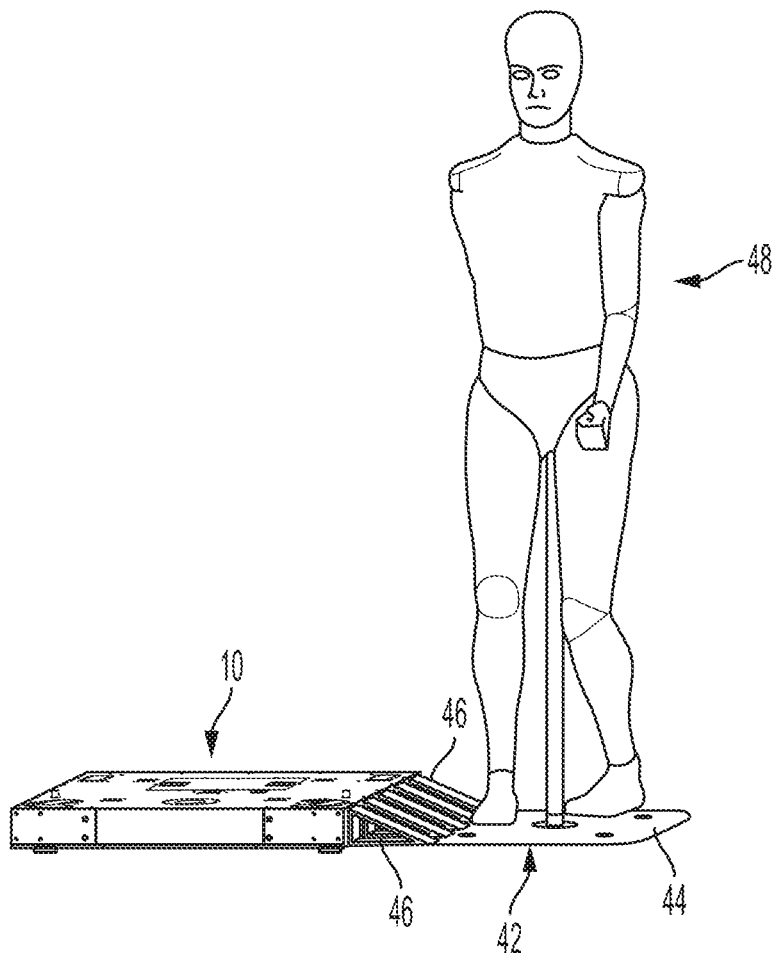
FIG. 6 depicts an example embodiment of a robotic platform that includes an extension assembly on which a testing apparatus in the form of a pedestrian soft target has been mounted according to one or more aspects of the present disclosure.

As shown in FIG. 6, an example automotive testing system may include an extension assembly in the form of an optional extension assembly 42 that can be mounted on any or one or more sides of the platform 10. The extension assembly 42 comprises a low plate 44 (which may be attached to the platform 10 by support braces 46), the top of which may, in an embodiment, ride 25 mm from the ground when the platform wheel suspension is fully extended. Since a vehicle being tested may approach the low-profile robotic platform from the same side the soft target is mounted (e.g., approaching the soft target's left arm in FIG. 6), the support braces 46 may provide additional overrunability and lessen the impact on the vehicle. The low plate 44 may include magnets and other mounting hardware points (such as a component configured to receive a mounting pole) designed and spaced to accommodate one or more testing apparatus such as one or more soft targets 48 (pedestrian, bicyclist, motorcyclist, etc.) from major manufacturers. Alternatively, a custom-made target or other human form (such as a mannequin or dummy) may be mounted on the chassis 12 or the plate 44 of an extension assembly 42.

The platform chassis 12 and optional extension assembly 42 may be covered in radar-absorbing material. The radar cross section of a low-profile robotic platform, extension assembly, and/or soft target assembly preferably lies within the bounds specified by the relevant ACEA (or other standards-setting body) pedestrian and cyclist soft-target specifications.

Referring back to FIG. 1, magnets 50 (or other coupling component) may also be included on the planar top surface 52 of the platform for mounting testing apparatus such as soft-targets on the chassis 12. Such can be used in circumstances where clearance between the soft target and the ground is not a concern.

Figure 4:
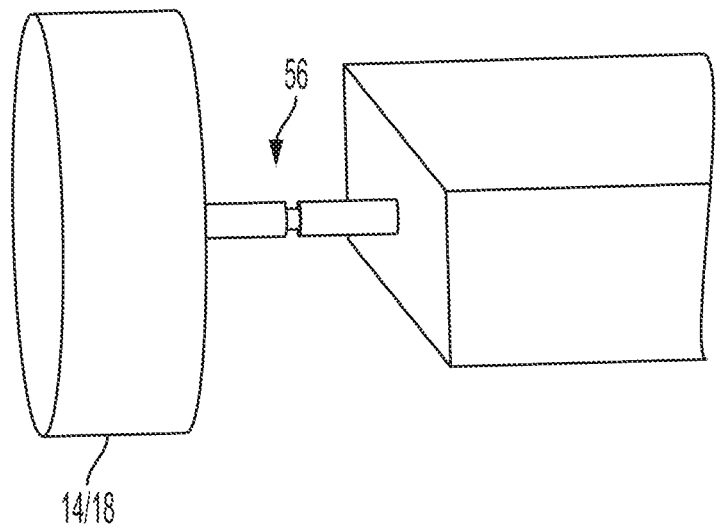
FIG. 4 illustrates an example embodiment of a breakaway wheel system that includes a mechanical fuse for a robotic platform according to one or more aspects of the present disclosure.
Figure 5:
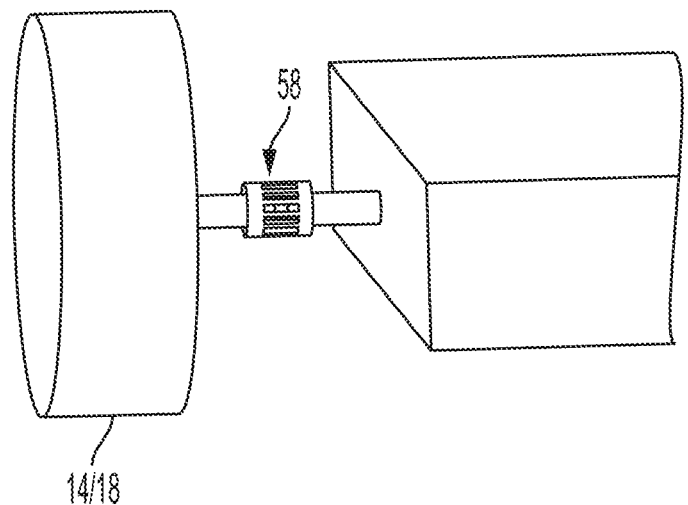
FIG. 5 illustrates an example embodiment of a breakaway wheel system that includes two coaxial shafts linked by a coupler for a robotic platform according to one or more aspects of the present disclosure.

Referring to FIGS. 4 and 5, in an embodiment, the robotic platform may include break-away wheels. Such an embodiment may includes wheels 14/18 mounted to a shaft 56/58 which may be intentionally weakened at one or more points, forming a mechanical fuse. A mechanical fuse may allow the shaft to support typical test payloads without breaking but may be designed to break away when struck or when the robotic platform is loaded by the weight of a vehicle (or some other maximum pre-determined load). Once the shafts are broken, the chassis of the platform may ground out, allowing for a lower overrun height for a given wheel diameter. Shafts may be selectively weakened by localized thinning (e.g., as shaft 56 in FIG. 4), or a mechanical fuse may comprise two solid shafts linked coaxially by a coupler that has a lower breaking strength than either shaft (e.g., shaft 58 in FIG. 5). This may permit the use of much larger diameter tires (for a given platform overrun height), potentially including aggressive or offroad treads. This in turn may permit increased ground clearance and traction, thereby allowing for operation on significantly rougher terrain, including off-road over dirt, rocks, and grass. This may also allow for mounting or dismounting curbs without using ramps so that the platform may reproduce a wider variety of vulnerable road use behavior, such as a pedestrian venturing into a road at an unconventional point. Shaft connections to the chassis may allow the end user to easily replace the broken sacrificial component, allowing testing to continue.

Shafts may be long enough to allow wheels to protrude beyond the chassis edge, allowing for the use of straight vertical or sloped platform sides.

Figure 10:
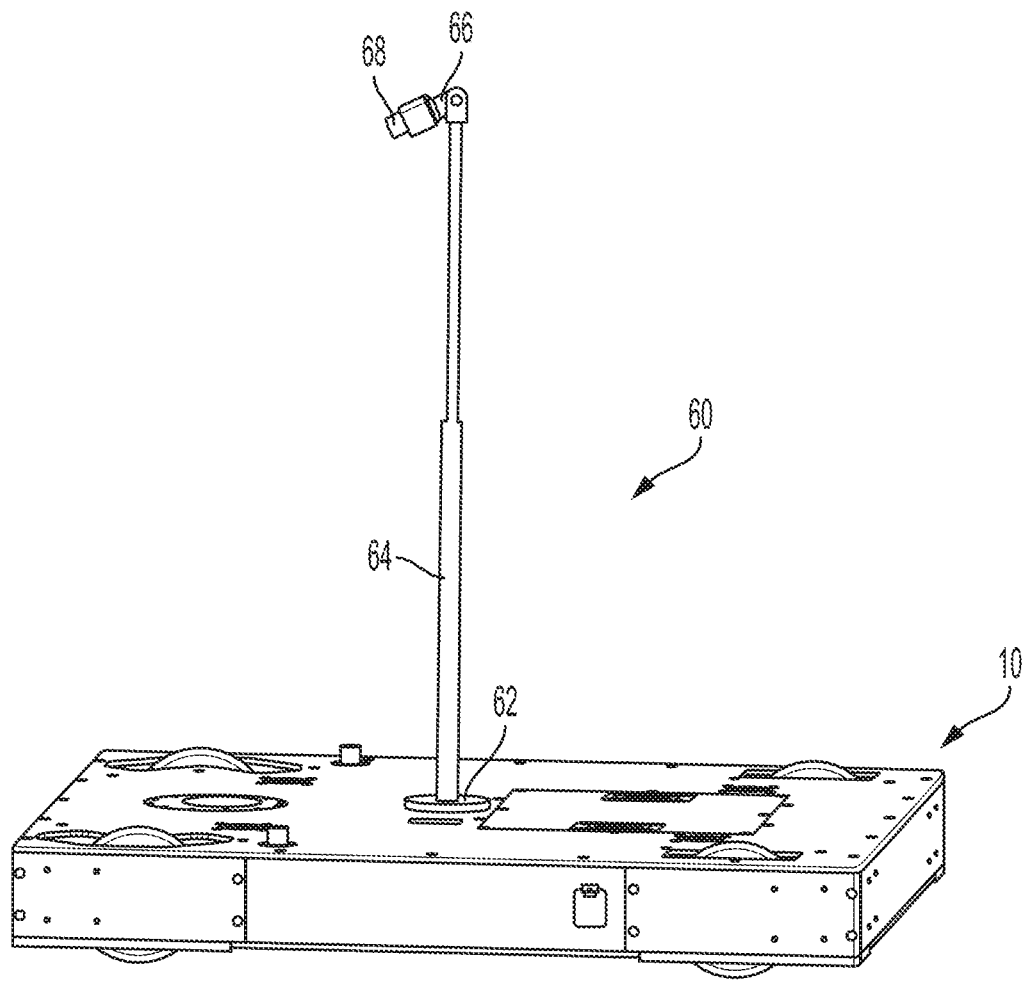
FIG. 10 depicts an embodiment of a vision system operatively coupled to a robotic platform in accordance with one or more aspects of the present disclosure.

Referring to FIG. 10, a camera mount 60 for an exemplary vision system (described in detail below) may be provided. An example camera mount may include a magnetic base 62, a pole 64 (which may be one to three feet high and/or may telescope to such a height), and a pitch angle adjustment mechanism 66 that allows the camera 68 to either be aimed slightly down (for enhanced lane line detection) or straight forward (for stoplight detection). Short hidden alignment pins on the underside of the base may ensure fit into shallow pockets in the platform lid to ensure that the camera has no angle in the yaw direction. The pins may be short enough that the assembly may separate harmlessly from the robot in a collision.

Referring back to FIGS. 1 and 2, an example low-profile robotic platform 10 may be powered by a modular battery pack 70. Battery life may depend on testing duty cycle, battery capacity, components powered during a test, and the like. In typical test day, during activities involving 10% active (moving) run time and 90% idle (stopped) times, a single pack may be sufficient for a full 8-hour test day. Battery packs 70 may also be easily swapped by removing four bolts (or other coupling or securement mechanism(s)) with an electric hand tool, lifting the depleted battery pack out of the robot using fold-away handles 72 on the lid of the battery pack, inserting a charged battery pack into the socket, and then reinstalling the four bolts (or other coupling or securement mechanism(s)). Batteries may be charged in at least two ways. The platform itself may include a charging port 74 that allows the installed battery pack to be charged from standard AC wall power using a provided cable assembly without removing the battery pack from the platform. Batteries may also be removed from the robot and charged in a separate dedicated rapid charging station, which may also run off of AC wall power.

Figure 9:
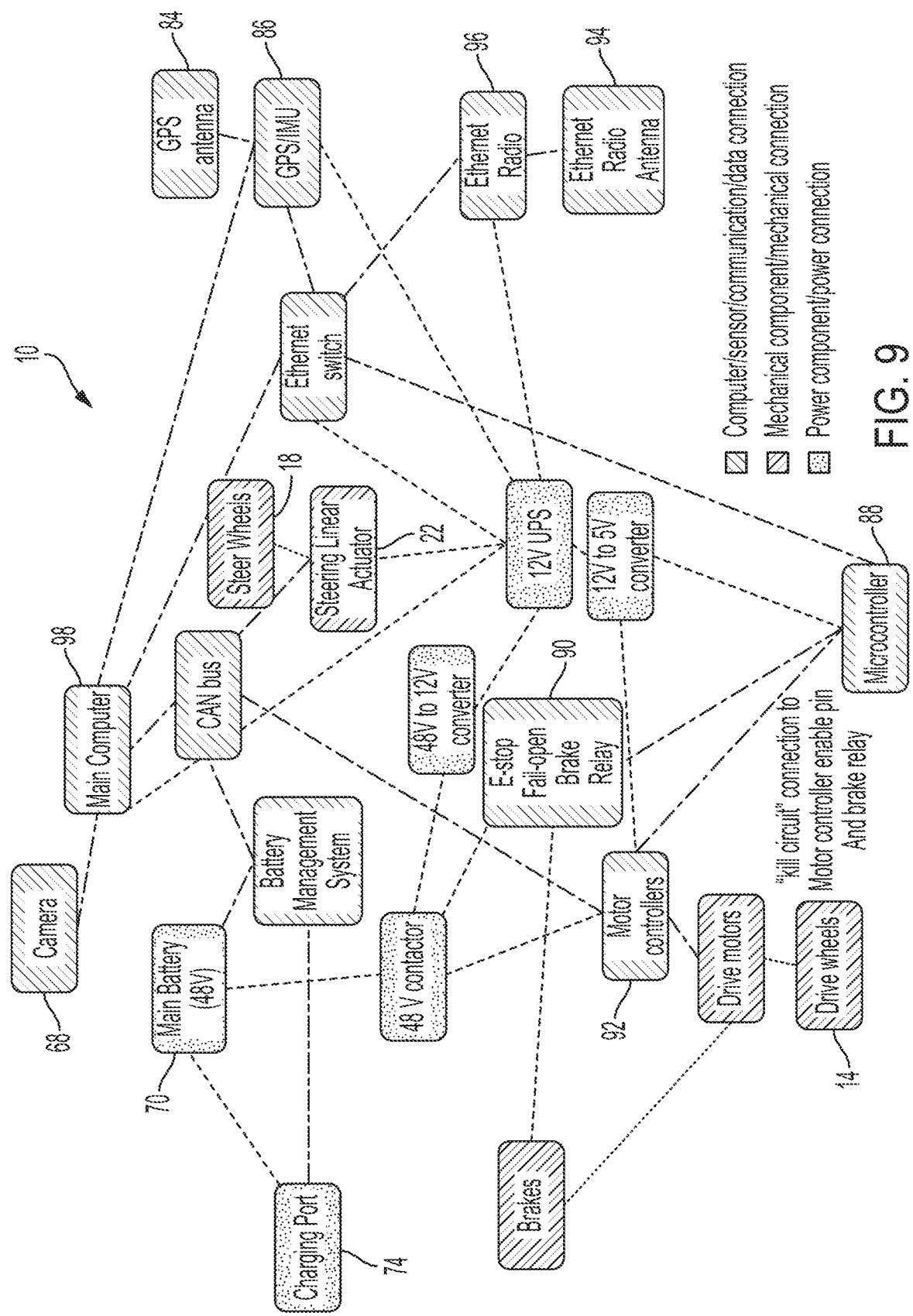
FIG. 9 is an example block diagram showing electrical, data, and mechanical connections of a robotic platform according to one or more aspects of the present disclosure.

FIG. 9 provides a block diagram representation of an example low-profile robotic platform 10. Forward-slash-hatched boxes and corresponding lines represent computer/sensor/communication/data connection. Back-slash-hatched boxes and corresponding lines represent component/mechanical connection. Dotted boxes and corresponding lines represent component/power connection. As shown in FIG. 9, the platform 10 may include a GPS antenna 84 and an internal IMU (inertial measurement unit) 86 for GPS position sensing and vehicle state sensing (e.g. vehicle speed, heading, angle). The platform also may include a "kill circuit" microcontroller 88 coupled to an e-stop fail-safe brake relay 90 and/or to the motor controllers 92 providing a connection to the motor controller 92. The function of the fail-safe brakes is described below. An Ethernet radio antenna 94, coupled to an ethernet radio 96 (or, alternatively, another wireless communication means) may be configured to receive remote control signals for transmission to a main computer 98. The ethernet radio 96 and antenna 94 or other wireless communication means may also be configured to transmit information back to the remote user platform and/or remote control. The overall system 10 may be controlled by the main computer 98.

An example low-profile robotic platform 10 may include fail-safe electromechanical brakes 17 (see FIG. 2) capable of stopping the platform at around 6 m/s$^2$. In order for the platform 10 to move, in this particular embodiment, the brakes 17 must be held in a disengaged position by power supplied to a relay that is dependent on an e-stop heartbeat monitor. Similarly, the drive motor controllers 92 may require a constant control signal to remain enabled, and this signal may also be dependent on the e-stop heartbeat. Therefore, in the event of power loss, network failure, or manual activation of the e-stop from the button on the hand control unit or the software interface, the drive motors may be disabled and brakes may automatically be applied.

The example platform 10 accelerates and decelerates in a smooth manner. Except during emergency stop maneuvers, in an embodiment, the first derivative of the platform's acceleration does not exceed 2 m/s$^3$. Carrying typical soft target loads of up to 14 kg, the platform drive shafts can rotate at a continuous speed of up to 1100 rpm, yielding a top linear speed which varies with the diameter of drive wheels used: 25 kph with 3.6 in wheels, and 32 kph with 4.6 in wheels.

In an embodiment, a low-profile, robotic platform may comprise a chassis having approximately 30"×30"×3.6" and four suspended wheels. The low-profile robotic platform may be configured for automotive testing of advanced driver systems, advanced driver-assistance systems, assisted driving systems, autonomous driving systems, partially autonomous driving systems, and the like. The low-profile robotic platform may be configured to carry or have mounted thereon one or more testing apparatus, such as one or more soft targets. A soft target may be mounted to a top surface of the robotic platform by magnets or one or more other attachment mechanisms. Alternatively, an extension assembly may be coupled to a robotic platform, and a soft target may be disposed on the extension assembly via a magnet or other attachment mechanism. For example, when a soft target is attached to the robotic platform or an extension assemble by magnets, the soft target may easily separate from the robotic platform or extension assembly when struck by a test vehicle. A suspension system may be provided as part of the robotic platform and may suspend one or more of the wheels such that the robotic platform may remain above the ground under normal loads but may collapse down such that the chassis contacts the ground when overrun by a test vehicle, allowing the load caused by the vehicle to be transferred directly through the chassis to the ground. The front wheels may be coupled to a steering system, while the rear wheels may be driven by electric motors and may be coupled to one or more brakes. In an embodiment, the electric motors may act as brakes. One or more of the wheels may be quickly swapped by a user by removing a single shaft collar. A robotic platform may include a suspension system allowing the robotic platform to operate with wheels having a variety of diameters (such as between 3 and 5 inches, and preferably between 3.5 and 4.6 inches) while still maintaining ground clearance under normal operating loads and allowing the chassis of the robotic platform to ground out under increased loads (such as the load of an automobile). Modifiable wheel diameters may allow an end user to customize particular wheels for particular test characteristics, including acceleration and top speed. In one embodiment, a spring based suspension system may allow an end-user to easily adjust the suspension stiffness by swapping out springs. Vertical suspension shafts may be threaded on the bottom and may have a screwdriver slot on the top, which may allow an end user to remove the shafts with only a screwdriver so new springs can be swapped and installed. A chassis may include vertical sides. In such a configuration, wheels may be located close to an outer perimeter of the robotic platform while still being able to fully retract into the platform under a heavy load, enabling the robotic platform to ground out. Such a configuration may improve performance on rough and uneven test terrain by eliminating the overhang inherent to designs with tapered sides and fully retractable wheels. It may also reduce the overall outer perimeter of the system and allow navigation of sidewalks and sidewalk ramps. Additionally, a robotic platform may comprise a sacrificial wear plate (which may be constructed from a thermoplastic such as ultra high molecular weight polyethylene), which may be swapped after it becomes worn from repeated overrun or ground-out instances. A robotic platform may include GPS circuitry for position sensing and determination and an inertial measurement unit for state sensing. A robotic platform may include a safety kill circuit including a drive motor power kill feature and fail-engaged breaks in the event of loss of network connections, breach of a geo-fence, and/or a stop command input by a human observer. A robotic platform may further include an easy-swap system for a main battery pack, including a supplemental battery to power electronics during battery changes. A robotic platform may further include a camera-based and/or lidar-based vision system mounted on the robotic platform, which may optionally include a mount to raise all or part of a vision system above the platform surface.

Figure 7:
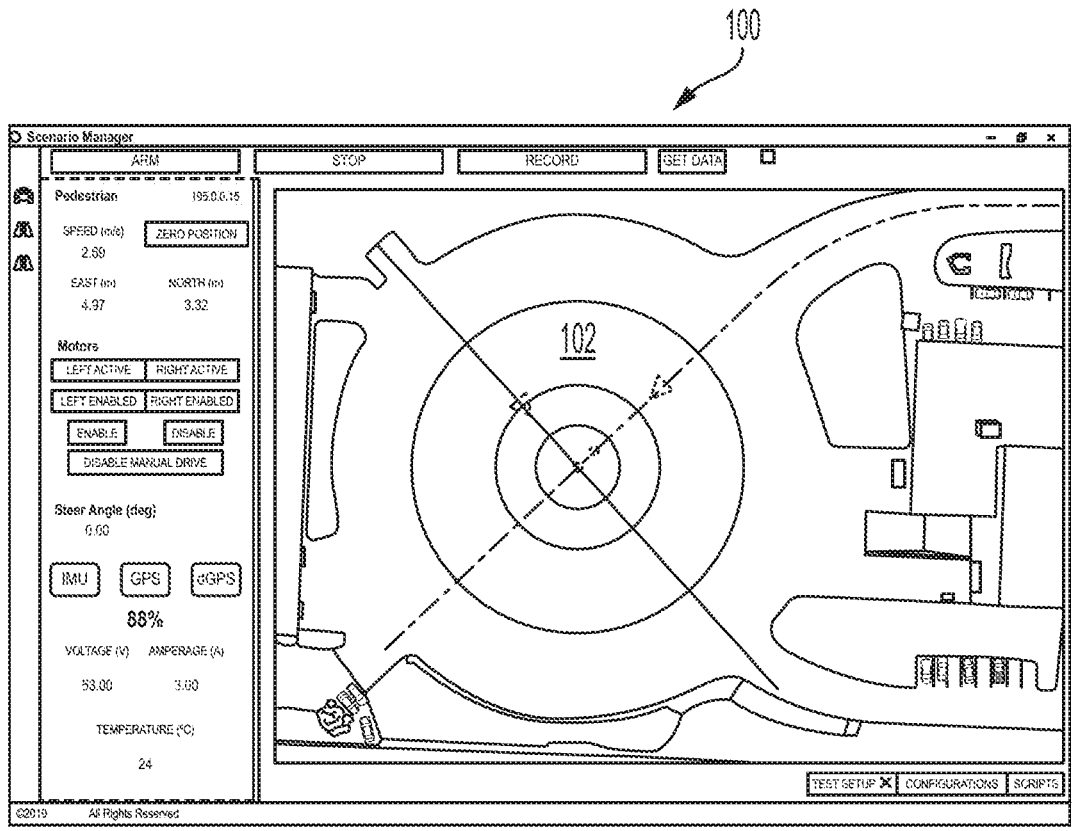
FIG. 7 depicts an example software platform for monitoring, observing, and controlling a robotic platform according to one or more aspects of the present disclosure.

Referring to FIG. 7, the exemplary platform software may include a graphical user interface 100 that runs on a laptop and facilitates test setup, execution, and monitoring. The interface may include an overhead map 102 showing the platform and test vehicle positions, orientations, and target paths as well as additional system parameters such as battery temperature and state of charge.

The example platform may communicate with the test vehicle, the E-stop controller, and/or the software interface via a wireless ethernet radio network or other wireless communications protocol. Communication may be facilitated by a control station unit.

The example system may feature a remote control with dual analog joysticks which may allow intuitive manual control of the platform's speed and steering. The top speed under manual control may be configurable in software. Under manual control, the platform's speed may vary smoothly between zero and the specified top speed with the position of the analog joystick. Steering similarly may vary smoothly between center and the left/right extremes.

The remote may also include a wireless emergency stop button.

The example platform may be capable of GPS waypoint-based path following. Paths may be stored as lists of x-y GPS coordinates. Paths may be imported into the software (from a manually or programmatically generated text file); or recorded and imported by manually controlling the platform; or manually operating a vehicle equipped with a GPS and/or inertial measurement unit motion pack and the vehicle electronics box. The platform software may also include a feature to automatically interpolate waypoints at the appropriate spacing when the distance between points in a supplied path is too high (as may occur when the path is manually specified).

Under normal operating conditions using differentially corrected GPS data, path following performance may be generally accurate to ±5 cm.

The example robotic platform may include a variety of trigger modes. For example, the robotic platform may be triggered manually and wirelessly from a laptop running control software. Optionally, the robotic platform may also be configured to accept manual triggers from a handheld control unit. A physical gate system may be used to trigger the platform. The gate may include an IR laser tripwire system that may pass between two portable post units. The post units may be placed on either side of the test vehicle path such that the test vehicle may activate the tripwire. The posts may be wired to the control station electronics box, which may generate a trigger signal for the platform to start the test. Alternatively, or additionally, the robotic platform may be configured to trigger when the test vehicle passes through a "virtual" gate consisting of GPS coordinates. The gate position and orientation can be specified manually using a click-and-drag interface on the software map display. The gate can also be defined by selecting a point on the path of the test vehicle, thereby triggering the platform when the vehicle passes through that point (or a nearby point on a line lying perpendicular to the nominal path and passing through the selected point). The gate can also be specified by driving the test vehicle to the desire gate location and specifying "current location" in the software interface. The robotic platform may be configured to trigger when the test vehicle velocity exceeds a user-defined threshold. Alternatively, or additionally, the robotic platform, upon integrating a vision-based control system, may be configured to receive triggers from external visual sources such as a traffic signal changing from red to green.

The automated robotic platform motion may be able to be synchronized to the motion of a test vehicle (which may be constantly adjusting speed or direction) to ensure collision paths consistent with the test scenario. The coordinated motion mode may work for either human-driven or robotically driven test vehicles. Using the software interface, the system may allow the user to specify "target" locations for the platform and the test vehicle. The platform and test vehicle target locations may be coincident or may be separated by any distance, and each may lie on the object's nominal path. During a test with target locations, the system may constantly calculate the test vehicle's "time to destination" based on its current speed and the distance to the test vehicle target location along the nominal path (which many include and account for curved path profiles). The robotic platform may automatically adjust its speed and/or direction so that, accounting for the remaining distance along the platform's path, it will reach the target point at the same time as the test vehicle.

The user may also specify upper and lower limits on the allowable platform velocity, and the system may automatically abort the test, warn the user, and bring the platform to a controlled stop if the velocity required to reach the target point at the same time as the test vehicle exceeds the specified bounds.

It is also possible to compensate for lateral deviation of the test vehicle from its nominal path. When this option is enabled, the platform target location may be automatically displaced by a distance equal to the lateral distance between the test vehicle and the test vehicle's nominal path. With the graphical interface, the user may be able to specify the direction in which the displacement of the platform's target location occurs (by default set to the same direction as the test vehicle's lateral deviation from its path).

As with velocity, it is possible to place bounds on the allowable deviation in target location.

The system may also optionally feature GPS-based geo-fences, which may be defined from the software interface. If the robotic platform violates the geo-fence, the software automatically may take an action, such as engaging the e-stop.

Several modes of operation may available in an example embodiment, including manual control with handheld joysticks, GPS waypoint following with speed control, GPS waypoint following with adaptive speed control based upon another GPS-instrumented vehicle's speed or calculated time to a particular destination, platooning (following another GPS-instrumented vehicle at a certain specified distance), lane-line or marker-following using a vision system, and/or holding in place.

In additional, modes can be switched on-the-fly during a test in response to a variety of triggers, including a manual remote trigger, a velocity threshold of another GPS-enabled vehicle, a velocity threshold of the robotic platform, a "virtual gate" (or position threshold of another GPS-enabled vehicle, a "virtual gate" of the robotic platform, proximity to another vehicle, a time delay, or a visual trigger (such as a traffic light change detection).

Decelerations of up to 1.4 m/s$^2$ (with 4.6 inch diameter wheels) or 1.8 m/s$^2$ (with 3.6 inch diameter wheels) may be achieved using motor torque alone. Higher decelerations of up to 6 m/s$^2$ may be achieved via pulse width modulated activation of the same electromechanical brake system used in emergency maneuvers. The maximum deceleration allowed in normal testing (as distinct from e-stop events) may be configurable between 1 and 6 m/s$^2$.

In the exemplary platform's default state, robotic control may be disabled. Robotic control may be specifically enabled from the software interface, at which point the system may wait for an appropriate trigger as discussed above. Once enabled, robotic control may also be disabled at any time from the software interface or by triggering an e-stop. When the system is not executing a commanded motion (either from robotic or manual control) the brakes may be automatically engaged and the drive motors may be disabled, thus preventing motion and holding the robotic platform in one location, including on a slope.

In an embodiment, the robotic platform may include vision-based control, which may include a vision module that may include a camera 68, a padded camera mounting post 64 with a magnetic base 62, and an additional software package. The camera may mount on the pole, which may then attach to one of the magnets on the top of the platform. The camera may be ruggedized to withstand impacts, and the camera power/data cable may include a connector that detaches on impact, allowing the cable to survive most overrun incidents. Alternative vision sensing components may be added in addition to or as an alternative to a camera, including lidar, radar, and/or sonar. One or more of these components to provide enhanced vision sensing.

Notable capabilities added include the ability to perform lane following (using painted lane lines or traffic cones), thereby allowing navigation in GPS-denied environments such as tunnels. Additionally, AI software may allow the detection of some critical road features such as traffic signals, allowing traffic lights to trigger the platform. Visual alerts may also be made available on the wireless network for external data acquisition purposes, and these may also be used to trigger other devices on the network in real-time. In certain embodiments, the vision system may include an artificial-intelligence engine trained to visually recognize a lane marker, a reflective marker, a perimeter marker, a traffic signal, a traffic barrier, a traffic sign and/or a traffic cone. In some embodiments, the platform further may include a safety-brake system configured to automatically stop the platform upon determination by the computer control that the platform has traveled outside of a predefined perimeter and/or has contacted or is about to contact an object.

In an embodiment, the software can provide signals to a remote control/triggerbox interface (or similar) for articulated soft targets to turn in the articulating motion. The "on" signal may be defined by a GPS position, light gate, or other user defined trigger. The "off" signal may be based on a timer to allow for the completion of the test and to avoid burn out of the articulating motors.

In an embodiment, the platform vision system may have two main capabilities: traffic light detection and lane detection. Traffic lights may be detected and the current light color may be determined through the use of a neural network trained by a machine learning algorithm. Traffic light color change can be used as a trigger event, such as to start a test or change modes. Lane lines may be detected using an algorithm very similar to the one described on the following web page, which is herein incorporated by reference: https://towardsdatascience.com/finding-lane-lines-simple-pipeline-for-lane-detection-d02b62e7572b An example machine learning algorithm may be based on the publications "You Only Look Once: Unified, Real-Time Object Detection" by Redmon et al. and "YOLO9000: Better, Faster, Stronger" by Redmon and Farhadi. The source code for the algorithm used may be from an open-source project, YAD2K by Allan Zelener, which relies on code from several other open-source machine learning and image processing libraries to implement a version of the YOLOv2 machine-learning algorithm. The YAD2K project also facilitates the loading of machine-learning model parameters distributed by Redmon which were created during training on a larger dataset with Redmon's original implementation of YOLOv2. This process allows a significant increase in prediction performance due to the model having already learned important visual features from datasets containing millions of annotated images from thousands of different sources.

YAD2K already contains the code required to construct the machine learning model and all of its algorithms, train the model on annotated images, and load and run predictions of a saved model. To read the annotated boxes created in the data entry process in a more performant manner and to improve the training accuracy, a custom dataset management program may be constructed. This dataset management program's primary function is to load the annotated images created during the data entry process, augment them with various image processing techniques (e.g. randomized flips, rotations, and skews), and create Python generators which yield batches of data during training. In an embodiment, augmentation code for training images used by the dataset manager program may come from an open-source project Keras-RetinaNet. This augmentation applies transformations to both images and boxes, so it can be used for training box prediction models such as YOLOv2. The dataset management program may take advantage of the Keras library's built-in ability to train a model with a data generator. The Keras deep learning library is used extensively by the YAD2k project.

To improve performance, the original pre-trained weights released by Redmon may be re-trained for several epochs on the annotated traffic light images. This may result in a single trained model.

Via the software interface, the user may select whether the robot should center itself on a line, follow a line to either its left or its right (with a certain offset), or follow a path centered between two lines. This may also determine which region of the camera image is scanned for lines.

Once lines are detected, the software performs a coordinate transform based on the location and orientation of the camera, which are known based on morphology of the camera mount. The coordinate transform converts the lane lines as seen by the camera to a representation in the ground plane. Next, based on the settings selected by the user, the software determines the platform's target path, which is either on top of a line, offset from a line, or the median between two lines. Once the platform's target path is chosen, steering control proceeds as normal. The target path is reevaluated approximately 10 times per second as the platform travels along the lane.

An example platform also includes a geo-fence option. In the geo-fence option, the user clicks a series of points on the overhead map. The software then calculates and draws a polygon using the points as vertices. The area outside the polygon is then shaded red in the user interface. Every half second (using well-established algorithms), the software calculates whether the current platform position lies inside the defined polygon, and disables the drive motors and applies the brakes if it does not.

In an embodiment, an example robotic platform may have integral software and/or corresponding software housed on a remote computing device having one or more of the following features: a multiple-mode operation where either a human-operated, remote-control mode for maneuvering the robotic platform indoors, maneuvering the robotic platform to a start position outdoors, or generally maneuvering the robotic platform, or a computer-controlled autonomous mode featuring GPS path following and speed control; a monitoring feature that monitors the robotic platform's position and displays a location to a user on a remote computing device on a graphical map of the surroundings; a monitoring feature that monitors one or more selectable test vehicle states (e.g., vehicle speed, steering, heading, etc.); a monitoring feature that monitors the main battery life, temperature, charge, and other battery characteristics; a monitoring mode that monitors network connections; user-selectable or definable robotic platform and test vehicle path profiles; user-definable speed profiles; position-based control changes (e.g., speed changes based on absolute or relative GPS locations); a stop feature for stopping the robotic platform in the event of a failure resulting in errors in directional control or speed control; manual or autonomous ability to return the robotic platform to a home or start position after a test is complete or a stop event occurs; geo-fencing for establishing boundaries for robotic platform operation; a vision system allowing for lane-line, reflective marker, sign, traffic-light, traffic-cone, or the like-based path following, including in GPS-denied areas such as tunnels; and/or a vision-based geo-fencing feature comprising a series of markers placed on a perimeter of a test area capable of being detected by an integrated vision system and triggering a safety-kill feature.

Having described the various inventions supported herein by reference to example embodiments, it will be apparent that modifications, combinations, and substitutions can be made from such example embodiments without departing from the scope of the various inventions as claimed. Further, it will be apparent that it is not necessary to meet any stated objects or advantages of such example embodiments to fall within the scope of the various inventions as claimed; as any of the various inventions disclosed and/or claimed may provide advantages that are apparent, inherent, and/or simply unstated.

What is claimed is:

1. A robotic platform for automotive testing, comprising:
   a low-profile chassis including a substantially planar top surface and one or more substantially vertical side surfaces at least partially enclosing an interior;
   at least one first rotational element supported within the chassis interior, the at least one first rotational element being coupled to a drive motor;
   a control system coupled to the drive motor and configured to control the drive motor;
   wherein the at least one first rotational element is supported within the chassis interior by a suspension, wherein the suspension is configured to support the chassis above the ground when supporting a soft target, and wherein the suspension is configured to allow the chassis to ground out when the chassis is subjected to a pre-determined load greater than the load when supporting the soft target.

2. The robotic platform of claim 1, further comprising at least one second rotational element supported within the chassis interior, the at least one second rotational element being coupled to a steering control, wherein the at least one second rotational element is configured to pivot in response to a signal from the steering control.

3. The robotic platform of claim 2, further comprising a first rectangular-shaped cut-out portion for the at least one first rotational element and a second cut-out portion for the at least one the second rotational element, wherein the second cut-out portion has a shape selected from the group consisting of arcuate, irregular polygon, and apeirogon.

4. The robotic platform of claim 1, wherein the chassis has approximate dimensions of 24"×24"×1.88".

5. The robotic platform of claim 1, further comprising a planar extension plate coupled to the chassis and extending from one of the side surfaces, the planar extension plate including a mounting point configured to support one or more soft targets.

6. The robotic platform of claim 1, wherein the substantially planar top surface further includes a mounting point configured to support one or more soft targets.

7. The robotic platform of claim 1, wherein the at least one first rotational element is positioned with respect to at least one of the one or more of the substantially vertical side surfaces so that the distance from the at least one of the one or more of the substantially vertical side surfaces to the center of the the at least one first rotational element is less than the height of the chassis.

8. The robotic platform of claim 1, further comprising a vision system including:
   one or more detectors coupled to the chassis and configured to transmit one or more detection signals corresponding to one or more operating environment elements;
   an artificial-intelligence engine coupled to the one or more detectors and the control system;
   wherein the one or more detectors transmits the one or more detection signals to the artificial-intelligence engine, the artificial-intelligence engine processes the one or more detection signals and transmits one or more guidance signals to the control system, and the control system transmits one or more control signals to the drive motor.

9. The robotic platform of claim 8, wherein the one or more detectors includes one or more of a camera, a lidar unit, a radar unit, and a sonar unit.

10. The robotic platform of claim 9, wherein the one or more operating environment elements are selected from the group consisting of a lane marker, a reflective marker, a perimeter marker, a traffic signal, a traffic barrier, a traffic sign, or a traffic cone.

11. The robotic platform of claim 1, wherein the at least one first rotational element is a wheel supported within the chassis on a wheel shaft, the wheel being coupled to the corresponding wheel shaft by at least one removable shaft collar.

12. The robotic platform of claim 11, wherein the wheel is replaceable by removing the at least one shaft collar, replacing the wheel, and re-affixing the at least one shaft collar.

13. The robotic platform of claim 1, wherein the at least one first rotational element is a wheel coupled to a wheel shaft, the wheel shaft supporting the wheel within the chassis, and wherein the wheel shaft includes a mechanical fuse configured to break when subject to a pre-defined load.

14. The robotic platform of claim 13, wherein the wheel shaft comprises two wheel shaft components coupled by a coupling along the shaft, and wherein the coupling is configured to break when subject to the pre-defined load.

15. The robotic platform of claim 13, wherein the mechanical fuse is a thinned section of the wheel shaft, and wherein the thinned section is configured to break when subject to the pre-defined load.

16. The robotic platform of claim 1, wherein, for the at least one first rotational element, the suspension includes:
   a bearing block;
   a wheel shaft coupled at one end to the at least one first rotational element and extending through a bearing in the bearing block on another end;
   two suspension shafts extending approximately perpendicularly to the wheel shaft, each suspension shaft coupled to the chassis and extending through at least a portion of the bearing block; and
   two springs, each spring corresponding to and disposed around one of the suspension shafts;
   wherein the springs maintain a force on the wheel shaft sufficient to maintain the chassis above the ground during operation and compress to ground out the chassis when the chassis is subjected to a pre-determined load greater than the load when supporting the soft target.

17. The robotic platform of claim 16, wherein each suspension shaft includes a threaded end and a screwdriver slot end, each threaded end being threaded into a correspondingly threaded bore of the chassis, and wherein the bearing block is slidably positioned on each suspension shaft between (a) the springs and (b) either the threaded end or the screwdriver slot end of the suspension shaft.

18. The robotic platform of claim 1, wherein, for the at least one first rotational element, the suspension includes:
   a bearing block;
   a wheel shaft coupled at one end to the at least one first rotational element, the wheel shaft extending through a bearing in the bearing block and extending centrally through at least a portion of a flexible coupler at another end, the flexible coupler coupling the wheel shaft and a motor shaft of the drive motor; and
   at least two cantilevered springs;
   wherein the at least two cantilevered springs are coupled to the chassis at one end and the bearing block at another end;
   wherein each cantilevered spring extends coaxially along the wheel shaft; and
   wherein each cantilevered spring is disposed on a lateral side of the wheel shaft.

19. The robotic platform of claim 18, wherein the cantilevered springs possess a stiffness and length sufficient to maintain the chassis above the ground during operation, and wherein the cantilevered springs flex to allow the chassis to ground out when the chassis is subjected to a pre-determined load greater than the load when supporting the soft target.

20. The robotic platform of claim 1, further comprising a sacrificial wear plate covering the underside of the chassis and having a cut-out for the at least one first rotational element.

21. The robotic platform of claim 20, wherein the sacrificial wear plate is constructed from ultra high molecular weight polyethylene.

22. The robotic platform of claim 1, wherein the substantially planar top surface of the chassis is substantially rectangular.

23. The robotic platform of claim 1, wherein the chassis is less than 5" high.

24. The robotic platform of claim 1, wherein the chassis has approximate dimensions of 30"×30"×3.6".

25. The robotic platform of claim 1, further comprising a plurality of the first rotational elements, wherein at least one of the plurality of first rotational elements is coupled to a first drive motor and at least another one of the plurality of first rotational elements is coupled to a second drive motor, and wherein the control system is configured to independently control the first drive motor and the second drive motor.

26. The robotic platform of claim 25, further comprising a skid-steer system wherein, on receipt of a command to steer, the control system is configured to signal the first drive motor to output a first power and the second drive motor to output a second power, wherein the first power and the second power are not equal.

27. The robotic platform of claim 1, further comprising one or more of a GPS unit to provide positioning signals to the control system or an inertial measurement unit to provide heading signals and speed signals to the control system.

28. The robotic platform of claim 27, further comprising a safety brake system configured to automatically stop the chassis upon a determination by the control system that a system failure exists, the chassis has traveled outside of a predefined perimeter, a timing event has occurred, the chassis has contacted an object, or the chassis has contacted the ground.

* * * * *